July 28, 1931.  S. G. DOWN  1,816,075
AIR SPRING FOR MOTOR VEHICLES
Filed March 26, 1926
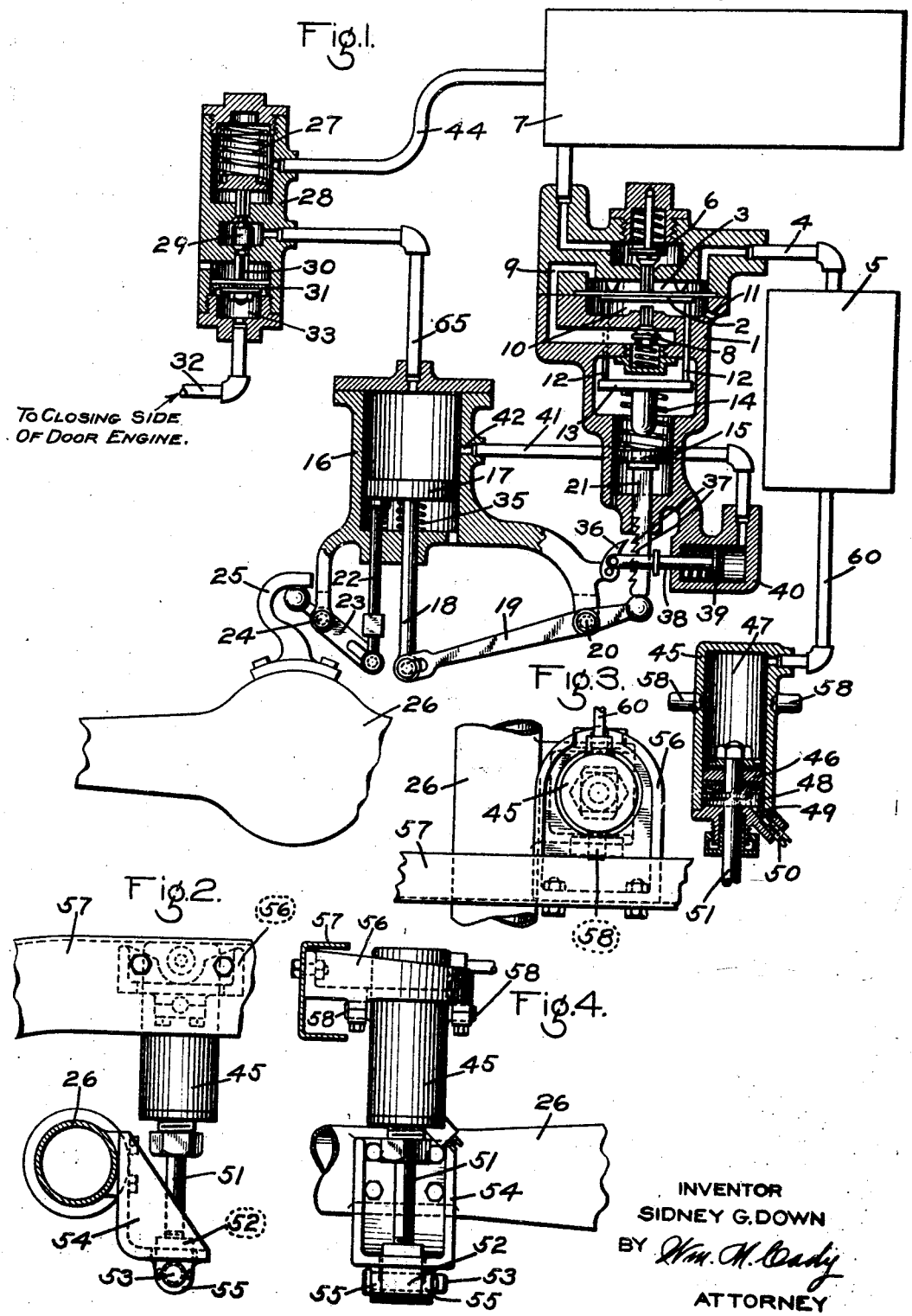
INVENTOR
SIDNEY G. DOWN
BY Wm. M. Cady
ATTORNEY Patented July 28, 1931

1,816,075

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIR SPRING FOR MOTOR VEHICLES

Application filed March 26, 1926. Serial No. 97,662.

This invention relates to the control of fluid cushion devices, such as are employed as springs to cushion shocks on motor vehicles.

The load carried by motor vehicles varies, particularly on vehicles adapted for a large number of passengers, such as motor buses. Where fluid cushion devices are employed, it will be evident that if the air pressure in the cushion device is right for a certain load, it will not be correct for a greater or lesser load, so as to give the desired cushioning effect.

The principal object of my invention is to provide means for automatically regulating the pressure of fluid in the cushion devices to correspond with the load on the vehicle.

In the accompanying drawings; Fig. 1 is a diagrammatic view, principally in section, of a fluid cushion device and apparatus embodying my invention for the purpose of regulating the pressure in fluid in the cushion device; Fig. 2 a detail side view of the cushion device, showing the manner of attaching same to the vehicle frame and axle housing; Fig. 3 a plan view of the construction shown in Fig. 2; and Fig. 4 an end view thereof.

According to my invention, the mechanism may include a pressure regulating valve device comprising a casing 1 containing a flexible diaphragm 2, having chamber 3 at one side connected by pipe 4 to a storage reservoir 5, from which fluid at a pressure corresponding with the load on the vehicle is supplied.

The movement of the diaphragm 2 in one direction is adapted to unseat a fluid supply valve 6 and permit the supply of fluid under pressure from a source of fluid pressure, such as reservoir 7, to chamber 3 and the reservoir 5. The movement of the diaphragm 2 in the opposite direction is adapted to unseat an exhaust valve 8 for venting fluid from chamber 3, through passage 9, to diaphragm chamber 10, which is open to the atmosphere through port 11.

Rods 12 extend from diaphragm 2 and engage a spring plate 13, subject to the pressure of a coil spring 14, the pressure of which is varied by the movement of a piston 15.

For positioning the piston 15 and thereby determining the compression of spring 14, a mechanism controlled by the relative movement of the vehicle body, with respect to the axle, and according to the load on the vehicle is provided, comprising a cylinder 16 secured to the vehicle body and containing a piston 17 having a stem 18. A lever 19, fulcrumed on the pivot pin 20, is pivotally connected at one end to the piston stem 18 and the other end engages the lower end of a plunger 21 carried by the piston 15.

The adjusting movement of piston 17 is determined by the position of a rod 22 pivotally connected to one end of a lever 23. The lever 23 is fulcrumed on a pivot pin 24 and the other end of the lever is adapted to engage a hook member 25, which is secured to an unsprung portion of the vehicle, such as the axle housing 26.

In order to prevent the adjusting mechanism from acting continuously while the vehicle is running along the road, means are provided for cutting same out of action, such as that shown in Fig. 1, comprising a valve device 28 for controlling the admission and release of fluid to and from the piston 17. The valve 28 may comprise a casing containing a double beat valve 29 adapted to be engaged by a stem 30 which is secured to a piston 31. The chamber 33 at the under side of piston 31 is connected by pipe 32 to the closing side of a door engine (not shown) which is assumed to be employed on the vehicle for controlling the opening and closing of the car doors. Fluid under pressure is supplied to and released from the piston chamber above piston 17 through a pipe 65, which pipe leads to the chamber of the valve device 28 which contains the double beat valve 29.

The fluid cushion device, of which there may be one associated with each wheel of the vehicle, may comprise a casing 45 having a chamber containing a piston 46. The chamber 47 at one side of the piston is connected by pipe 60 to the reservoir 5 and chamber 48 at the opposite side is provided with an atmospheric exhaust port 49, the flow area of which may be adjusted by means of a threaded needle valve 50. Secured to the piston 46 is a rod 51 having a head 52 secured at the lower end which is bored to receive a pivot pin 53. The axle housing is provided with a boss, to which is secured a bracket 54 having lugs 55 adapted to engage opposite sides of the head 52 and bored to receive the pivot pin 53.

A bracket 56 is secured to the frame 57 of the vehicle and said bracket is provided with bearings to receive trunnions 58 carried by the casing 45.

In operation, when the vehicle is running along the road, the vehicle doors being closed, fluid under pressure is maintained on the door closing side of the door engine and consequently fluid under pressure is supplied to piston chamber 33. Piston 31 is therefore moved to its upper position, so that the double beat valve 29 is operated to engage its upper seat, cutting off communication from reservoir 7 to piston cylinder 16 and at the same time, the chamber above piston 17 is connected to the atmosphere by the valve 29 lifting from its lower seat. The spring 35 then acts to shift piston 17 upwardly, so that lever 19 is moved to prevent engagement of its outer end with the plunger 21. It will thus be evident that while the vehicle is running with the doors closed, any movement of plunger 21 by operation of piston 17 will be prevented.

When the vehicle is brought to a stop and the car doors are opened, fluid under pressure is vented from the door closing side of the door engine and consequently from piston chamber 33. The double beat valve 29 will then be moved downwardly by the spring 27, so that the double beat valve 29 will seat on its lower seat, in which the atmospheric connection to piston 17 is closed and communication is opened for admitting fluid under pressure from reservoir 7 to said piston.

The piston 17 will then be moved downwardly by fluid under pressure until it is stopped by engagement with the upper end of the rod 22. The position of the rod 22 is determined by the load on the vehicle and if the load is increased, for example, the vehicle body and the cylinder 16 will be moved downwardly relative to the axle housing 26. This permits a corresponding upper movement of the end of the lever 23 which engages the hook member 25 and thus permits a downward movement of the rod 22. The piston 17 will therefore move to the position as determined by the rod 22 and will act through the lever 19 to shift the plunger 21 and piston 15 to compress the spring 14 to a degree corresponding with the load on the vehicle.

The pressure of spring 14 is transmitted through the rods 12 to one side of the diaphragm 2 and if the pressure in reservoir 5, acting on the opposite side of the diaphragm is less than the adjusted pressure of spring 14, the diaphragm will be moved upwardly, so as to open the valve 6 and thus admit fluid under pressure from the reservoir 7 to the reservoir 5. When the pressure in reservoir 5 has been increased to a degree slightly exceeding the pressure of spring 14, the diaphragm 2 will be operated to permit valve 6 to seat and cut off the further supply of fluid to reservoir 5.

If the load on the vehicle is decreased, the rod 22 will be moved upwardly, so as to reduce the amount of movement of the piston 17 and this permits the plunger 21 to move downwardly and thus reduce the compression of spring 14. If the pressure in reservoir 5 is greater than the pressure of spring 14, the diaphragm 2 will be moved downwardly so as to open the valve 8 and thus vent fluid from reservoir 5 through passage 9, past the valve 8 to chamber 10 and thence to exhaust port 11.

It will thus be seen that the pressure in reservoir 5 is reduced or increased by operation of the mechanism described to provide a pressure in the reservoir corresponding with the load on the vehicle.

In order to lock the plunger 21 in its position of adjustment so that the adjusted compression of spring 14 will be maintained while the vehicle is running, a pawl 36 is provided. Said pawl is adapted to engage notches or teeth 37 in the plunger 21 and is pivotally connected to a piston rod 38, carried by a piston 39 contained in cylinder 40.

The cylinder 40 is connected to a pipe 41 which leads to a port 42 in the wall of cylinder 16. With this arrangement, when the vehicle is brought to a stop and fluid under pressure is supplied to cylinder 16, as hereinbefore described, as soon as piston 17 is moved downwardly, past the port 42, fluid is admitted, through pipe 41 to cylinder 40 and piston 39 is then operated so as to throw the pawl 36 out of engagement with the teeth of the plunger 21.

It will thus be seen that when the vehicle is not running, the plunger 21 may be freely adjusted by the operation of the adjusting mechanism, as hereinbefore described. When the vehicle is started, the piston 17 is shifted to its upper position, due to the venting of fluid under pressure from piston 17 by the operation of the speed governor 27, but at the same time, fluid is also vented from piston 39 by way of pipe 41 and port 42, in fact, the piston 39 will move before the piston 17 moves upwardly, since piston 39 has less resistance to movement, and since spring 43 acts on piston 39 with greater force relative to the opposing fluid pressure. The pawl 36 is thus operated by the outward movement of piston 39, so as to engage a tooth of the plunger 21 and thus lock and prevent movement of said plunger.

Having described how the fluid in reservoir 5 is maintained at a pressure corresponding with the load on the vehicle, it will be evident that if the reservoir 5 be connected to a fluid cushion device, as shown in the drawings, the pressure in said device or devices will also vary according to the load on the vehicle and consequently the fluid spring action of the fluid cushion devices will vary so as to compensate for varying loads on the vehicle.

Having now described my invention, what I claim as new and desire to secure by Letters Patent, is:—

1. The combination with means on a vehicle for automatically regulating the pressure of fluid in proportion to any change in the load on the vehicle, of a fluid cushion device subject to the pressure of fluid so regulated.

2. The combination with a reservoir and means on the vehicle for automatically regulating the pressure of fluid in said reservoir so that the pressure of fluid varies at all times in proportion to the load on the vehicle, of a fluid cushion device subject to the pressure of fluid in said reservoir.

3. The combination with a reservoir and means on the vehicle for automatically regulating the pressure of fluid in said reservoir so that the pressure of fluid is always proportional to any given load on the vehicle, of a fluid cushion device acting as a vehicle spring and including a piston subject to the pressure of fluid in said reservoir.

4. The combination with means on the vehicle for regulating the pressure of fluid according to the load on the vehicle, of means operated simultaneously with the opening and closing of a vehicle door for cutting said regulating means into and out of action and a fluid cushion device subject to the pressure of fluid so regulated.

5. The combination with means on the vehicle for regulating the pressure of fluid according to the load on the vehicle, of means subject to variations in fluid under pressure for cutting said regulating means into and out of action and a fluid cushion device subject to the pressure of fluid so regulated.

6. The combination with means on the vehicle for regulating the pressure of fluid according to the load on the vehicle, of means subject to variations in fluid pressure and operated upon the opening and closing of a vehicle door for cutting said regulating means into and out of action and a fluid cushion device subject to the pressure of fluid so regulated.

In testimony whereof I have hereunto set my hand.

SIDNEY G. DOWN.